Dec. 18, 1928.  
W. N. GRADICK  
1,695,651  
NUT CRACKING MACHINE  
Filed May 26, 1927 4 Sheets-Sheet 1
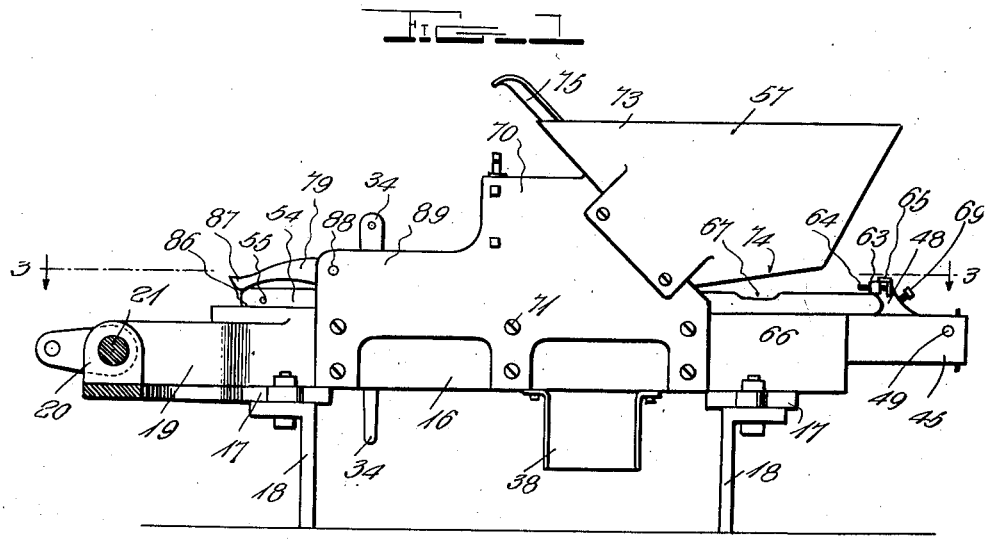
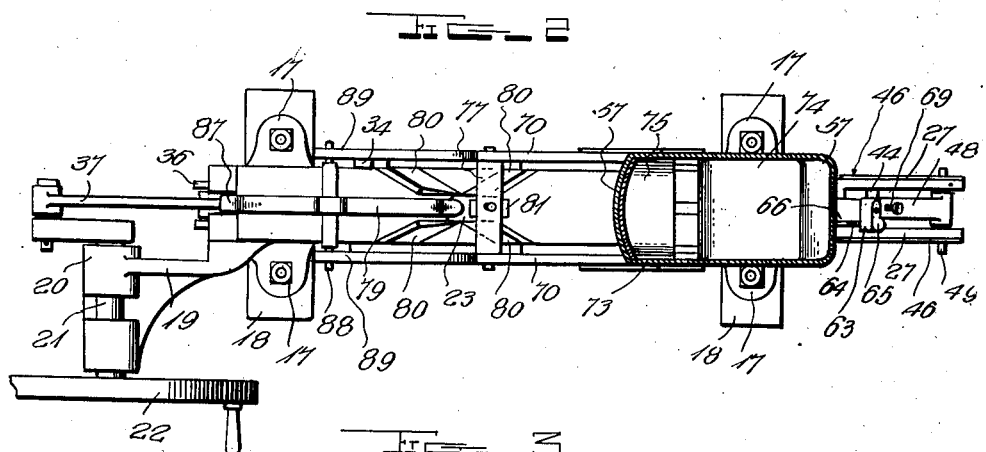
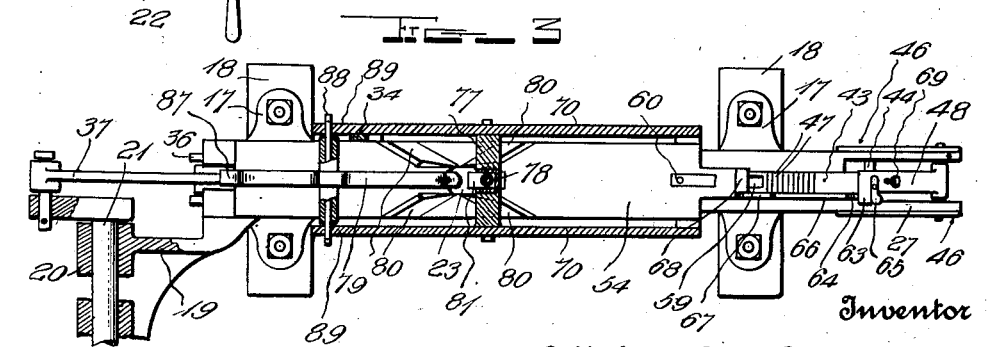
Inventor  
Wiley N. Gradick,
Witness

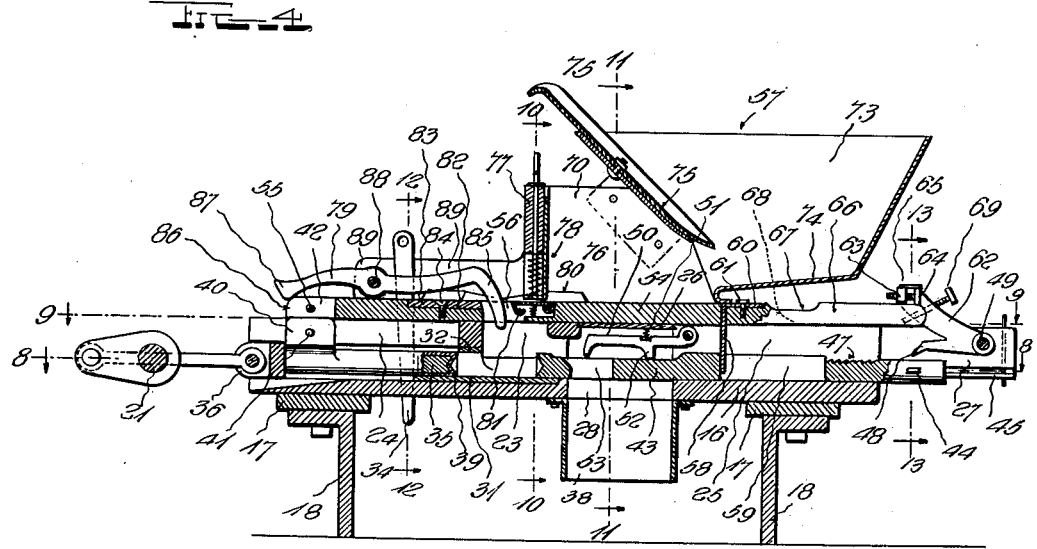
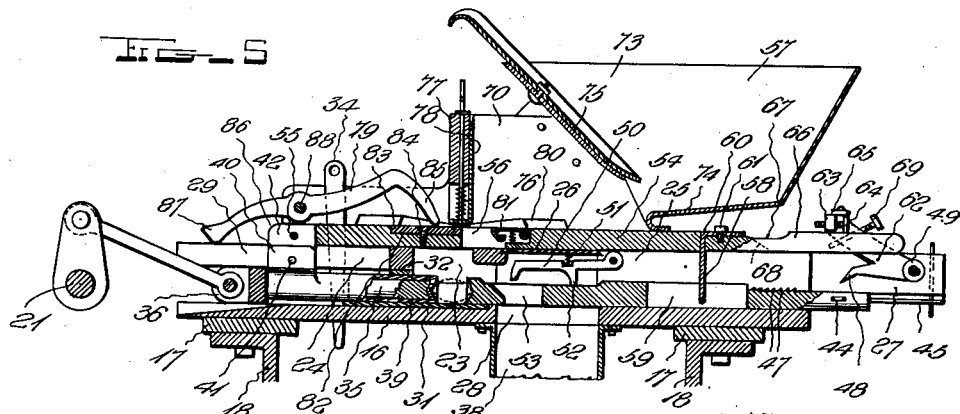
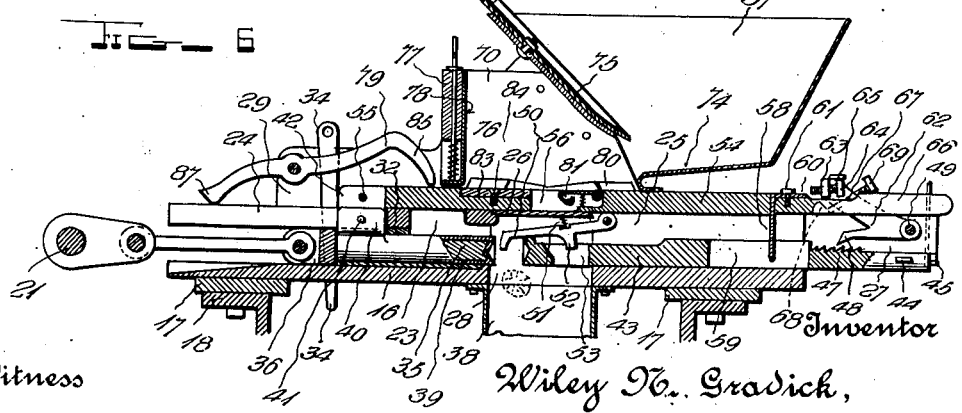

Dec. 18, 1928.
W. N. GRADICK
1,695,651
NUT CRACKING MACHINE
Filed May 26, 1927
4 Sheets-Sheet 3
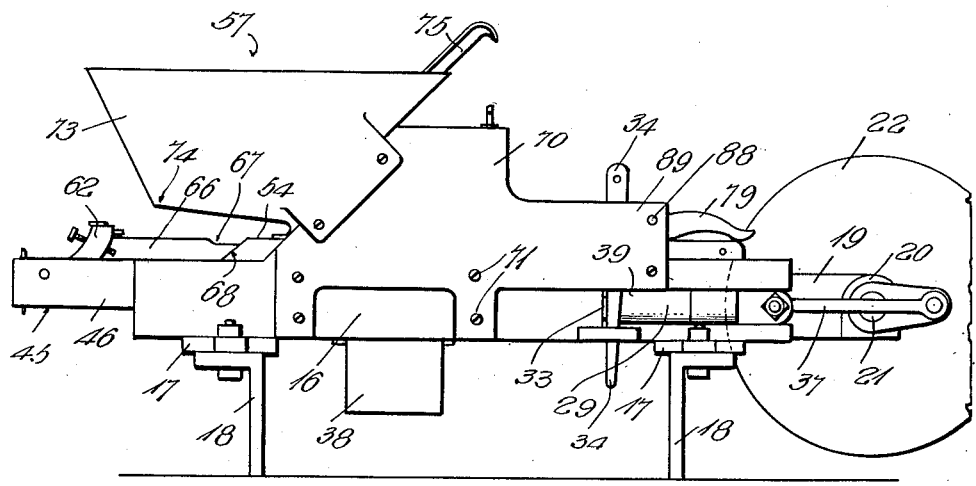
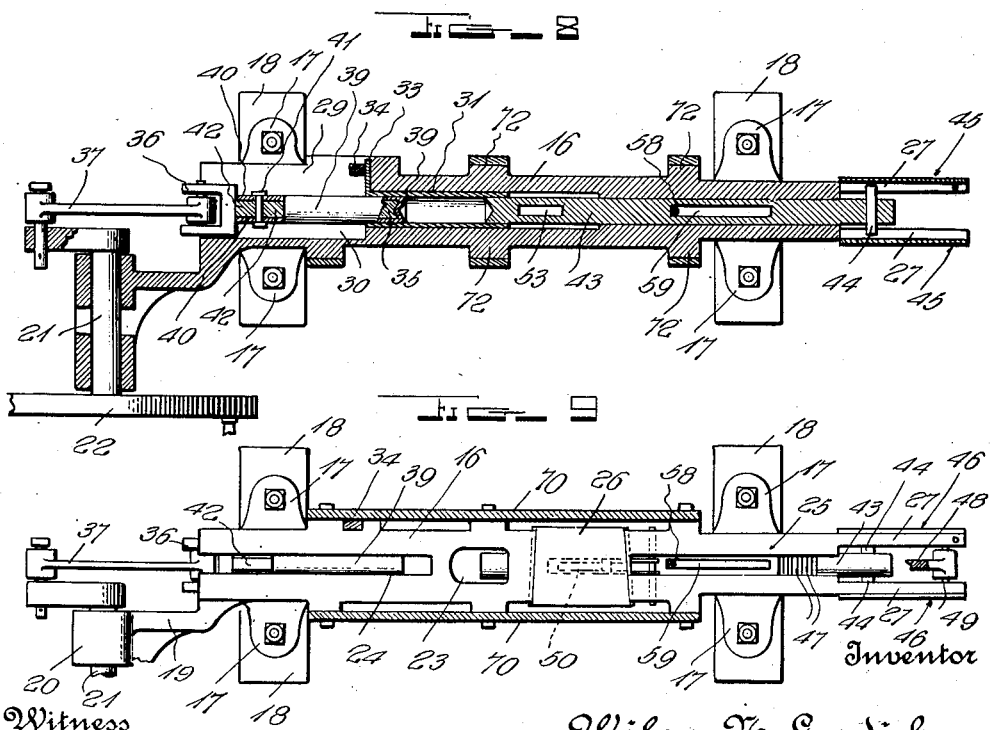
Inventor
Wiley N. Gradick Dec. 18, 1928.
W. N. GRADICK
1,695,651
NUT CRACKING MACHINE
Filed May 26, 1927        4 Sheets-Sheet 4
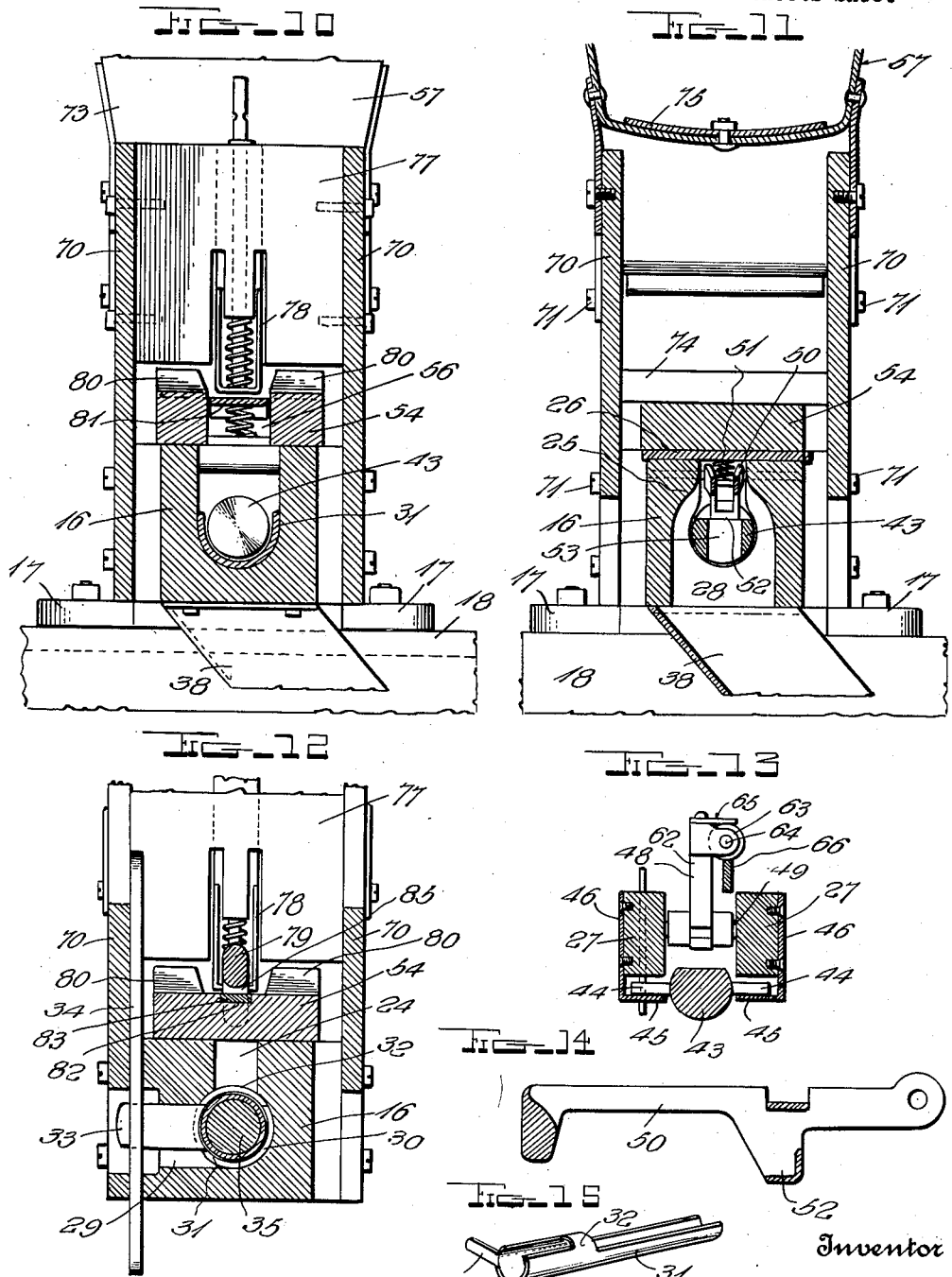

Patented Dec. 18, 1928.

1,695,651

UNITED STATES PATENT OFFICE.

WILEY NOETH GRADICK, OF TYLER, TEXAS, ASSIGNOR TO ALEX WOLDERT COMPANY, OF TYLER, TEXAS, A CORPORATION OF TEXAS.

NUT-CRACKING MACHINE.

Application filed May 26, 1927. Serial No. 194,426.

The invention relates to power driven machines for cracking nuts in large quantities and the principal object of said invention is to provide a generally improved and simplified machine of this character which will operate efficiently regardless of any slight variance in the size of the nuts being cracked, provision being made whereby the same machine may be conditioned for cracking either relatively large nuts or nuts of smaller size.

With the foregoing main object and numerous other objects in view, the invention resides in the novel subject matter hereinafter described and claimed, the description being supplemented by the accompanying drawings.

Fig. 1 is a side elevation.

Fig. 2 is a top plan view partly in horizontal section.

Fig. 3 is a horizontal sectional view on line 3—3 of Fig. 1.

Figs. 4, 5 and 6 are central vertical longitudinal sectional views showing different positions of parts.

Fig. 7 is a side elevation looking in the opposite direction from Fig. 1.

Figs. 8 and 9 are horizontal sectional views on the correspondingly numbered lines of Fig. 4.

Figs. 10, 11, 12 and 13 are vertical transverse sections on the correspondingly numbered lines of Fig. 4.

Fig. 14 is a longitudinal sectional view of the ejector which prevents lodging of cracked nuts in the machine.

Fig. 15 is a perspective view of one of the different sized cylinders in which the nut cracking plunger (of variable diameter) operates.

The form of construction selected for illustration in the present application, will be herein specifically described, with the understanding however, that within the scope of the invention as claimed, numerous variations may be made.

16 denotes a horizontally elongated hollow body provided with feet 17 to be bolted or otherwise secured to appropriate supports 18. At one end, this body is provided with an arm 19 carrying bearings 20 for a transverse crank shaft 21 which may be driven by a belt and a pulley 22, or by other desired means. For convenience of description, the end of the machine at which the crank shaft 21 is located, will be hereinafter referred to as the rear end of the machine. Similarly, the opposite end will be termed its front end.

The body 16 is hollow from front to rear and the upper side of said body is formed with a nut inlet 23, with a longitudinal slot 24 behind said inlet and with a longitudinal slot 25 in front of said inlet, the rear portion of the slot 25 being covered by a removable plate 26 for a purpose to appear, while the front end of said slot 25, opens into the space between two parallel arms 27 which project forwardly from the body 16. The lower side of this body is formed with a cracked nut outlet 28 which is spaced forwardly from the nut inlet 23, the rear portion of this body is provided with a lateral slot 29 extending longitudinally, and said rear portion is also formed with an internal longitudinal groove 30 disposed opposite said slot 29, this slot and groove being shown most clearly in Fig. 8.

A cylinder 31, preferably open at its top with the exception of the portion 32, is positioned removably within the body 16 and is provided with a lateral lug 33 (Figs. 8, 12 and 15), said lug passing outwardly through the slot 29 and being securely held by a removable wedge 34, against the inner end of said slot. The particular cylinder 31 herein shown is used when comparatively large nuts are to be cracked, but when nuts of smaller size are to be cracked, the wedge 34 may be withdrawn, the cylinder 31 rearwardly slid from the body 16, and a cylinder of smaller internal diameter, may then be substituted for said cylinder and held in place by the wedge 34.

A nut cracking plunger 35 is slidable in the cylinder 31 and is provided at its rear end with a cross head 36 which is slidably guided by the slot 29 and the groove 30, said cross head being connected by a pitman 37 with the crank of the crank shaft 21. The crank shaft and pitman alternately move the plunger 35 rearwardly to expose the inlet 23 (Fig. 4) and forwardly (Figs. 5 and 6) to crush the nut received from said inlet, the crushed nut being finally discharged through the outlet 29, which may be provided with a chute 38, leading to an appropriate receptacle.

I have shown a sleeve 39 surrounding the plunger 35 and provided at its rear end with upstanding ears 40 secured by a removable fastener 41, to opposite sides of a lug 42 which rises from said plunger, through the slot 24.

This sleeve is used to increase the diameter of the plunger when comparatively large nuts are to be cracked. When smaller nuts are to be cracked, the diameter of the plunger may be decreased by removing it from the machine and taking the sleeve off. At this time, a cylinder of smaller diameter is substituted for the cylinder 31. It will thus be seen that I have made provision whereby the diameters of both the plunger and the actual cylinder in which it operates, may be varied according to the size of the nuts to be cracked.

A floating anvil 43 is slidably mounted in the body 16, in front of the plunger 35, the front end of this plunger being provided with lateral guides 44 slidably received in guide ways 45, with which the arms 27 are provided. These guideways are preferably formed by inwardly bending the lower edges of metal plates 46 which are secured to the outer sides of the arms 27, as seen most clearly in Fig. 13.

The front portion of the anvil 43 has its upper side formed with a plurality of longitudinally spaced teeth 47, and a dog 48 is pivoted at 49 between the arms 27, said dog and teeth being co-operable to arrest the forward sliding of the anvil 43, under the influence of the plunger 35 and the nut which has been deposited between said plunger and anvil, while in the relative positions shown in Fig. 4. This dog 48 is controlled in a manner to be hereinafter described, but it may be stated that when the nut has been cracked, the dog is released, permitting the anvil 43 to shift forwardly, releasing the cracked nut as shown in Fig. 6.

To insure that the cracked nut shall not lodge between the plunger 35 and the anvil 43, I provide a pivoted ejector 50 which is mounted in the slot 25 of the body 16, under the plate 26 of the latter. This plate holds the operating spring 51 of the ejector 50, properly engaged with the latter so that said spring stands in readiness to swing said ejector downwardly from the idle position shown in Figs. 4 and 5, to the operative position disclosed in Fig. 6. The lower side of this ejector is provided with a lug 52 which normally rests upon the anvil 43 to hold the ejector against operation (see Figs. 4 and 5). The anvil however, is formed with a longitudinal slot 53 near its rear end, and when said anvil has been forwardly forced to a predetermined extent, said slot receives the lug 52, permitting the spring 51 to act, thus imparting a forcible downward impulse to the ejector 50, so as to knock out the cracked nut from between the plunger and anvil (see Fig. 6). Upon the next rearward movement of the anvil 43, the front end of the slot 53 strikes the lug 52 and restores the ejector 50 to its idle position.

Resting slidably upon the body 16 is a nut feeding slide 54 whose rear end is detachably connected with the lug 42 of the plunger 35, by a pin or the like 55, the plunger and feed slide being thus connected for movement bodily as a single unit. Slide 54 is formed with a nut conveying opening 56 which moves alternately into and out of a nut hopper 57 whose bottom is formed by said slide, and upon each movement of the opening 56 out of the hopper 57, said opening conveys a nut to and deposits it into the inlet 23 of the body 16, permitting said nut to drop into the space between the retracted plunger 35 and the anvil 43. Then, as the plunger 35 advances to effect nut cracking, the feed slide 54 again moves forwardly so that its opening 56 again receives another nut from the hopper 57. The movement of the feed slide 54 as the plunger 35 moves forwardly, permits the dog 48 to drop at the proper time into engagement with the teeth 47, thus arresting forward movement of the anvil 43, just before the crank of the shaft 21, reaches its forward dead center. Thus, the anvil 43 is stationarily held while the final forward movement of the plunger 35 takes place, permitting cracking of the nut but not allowing crushing thereof. After this cracking, the forward movement of the slide 54 again effects release of the dog 48 from the teeth 47, so that the anvil 43 may shift forwardly to some extent, releasing the cracked nut. At this time, the ejector 50 comes into play as above described.

In addition to controlling the dog 48 by means of the feed slide 54, I also utilize the movement of said slide for rearwardly returning the anvil 43 to its initial nut-engaging position, when said slide and the plunger 35 again move rearwardly. To accomplish this a lost motion connection is provided between the feed slide and the anvil, said connection preferably consisting of a downwardly projecting rigid pin 58 on the feed slide and a longitudinal slot 59 in the anvil 43, said pin passing through the slot 25 of the body 16. This pin may be secured to the feed slide in any desired manner but is here shown as carried by a plate 60 which is secured by a screw or the like 61 to said slide.

The manner in which the feed slide 54 controls the dog 48 will now be described. This dog is provided with an upward and rearward extension 62 having a lateral lug 63 in which a longitudinal screw 64 is adjustably threaded, said screw constituting an adjustable shoe and being held in adjusted position by a friction plate 65 secured to the dog extension 62. This shoe normally rests upon an arm 66 which projects rigidly forward from the feed slide 54, the upper edge of said arm thus forming a track which normally holds the dog 48 against engagement with the teeth 47. This track however, is provided with a notch or void 67 near the front end of the arm 66, and as the plunger nears the outlet 28, said shoe drops into said notch or void and hence the dog 48 engages the teeth 47 to arrest the rear movement of the anvil 43. Release of the dog 48 is effected by a forwardly declined cam 68 on the front end of the feed slide 54, said cam being engageable with a screw or the like 69 threaded through the dog extension 62. The manner in which this release of dog 48 is effected, is shown most clearly in Fig. 6.

The hopper 57 embodies a pair of side plates 70 secured by appropriate fasteners 71 against opposite sides of the body 16, which sides preferably have bosses 72 against which said plates contact. Hopper 57 also embodies a receptacle portion 73 having a rearwardly declined bottom 74 and provided at its front portion with a forwardly declined adjustable gate 75 which permits only a few nuts at a time to feed into the chamber 76 between the rear portions of the walls 70. A transverse end wall 77 extends between the side plates 70 and forms the rear wall of the chamber 76, said wall being provided with a vertically yieldable, spring-lowered section 78 which may yield upwardly in case the opening 56 of the feed slide 54, receives a nut of such size as to project somewhat above said slide. Thus, instead of being crushed, the nut may pass to a position outside of the hopper, that is, to the position occupied by the opening 56 in Fig. 4. When the opening occupies this position, the nut is positively forced from it by an ejector lever 79 which will be hereinafter fully described.

In addition to performing the functions already described, the feed slide 54 acts as an agitator for the nuts in the chamber 76. For this purpose, the upper side of said slide is provided with ribs 80 which converge both forwardly and rearwardly to the nut-receiving opening 56 of said slide, said ribs preferably having beveled surfaces which effect alternate lifting and dropping of the nuts in the chamber 76 to effectively agitate them. Moreover, the converging relation of the ribs is such that these ribs tend to feed the nuts one at a time, to the opening 56, for reception in the latter.

To prevent crushing of nuts which might otherwise take place, I prefer to provide the opening 56 with a yieldable wall, this wall being preferably in the form of a spring-sustained plate 81 mounted in a cavity in the feed plate 54, at the front end of said opening 56. Removably held in a groove 82 at the rear end of the opening 56, is a plate 83, a screw 84 being preferably employed to hold said plate in place. When relatively large nuts are to be cracked by the machine, a plate 83 such as that shown, is secured in the groove 82. When smaller nuts are to be cracked, a longer plate may be substituted so that it will extend forwardly to some extent and thus diminish the effective size of the opening 56.

The lever 79 which ejects any nuts from the opening 56 which would otherwise lodge therein, is longitudinally positioned over the rear portion of the feed slide 54, the front end of said lever being provided with a nose 85 which rests on the feed slide except when the opening 56 is under said nose, in register with the inlet 23 of the body 16. At this time, however, a cam 86 on the rear end of the feed slide 54 and preferably formed by a portion of the lug 42, strikes an additional cam 87 on the rear end of the lever 79. Thus, this lever is rocked to the position shown in Fig. 4, causing its nose 85 to pass downwardly through the registering openings 56 and 23, positively forcing the nut into the cylinder 31, between the plunger 35 and the anvil 43. Then, as the feed slide moves forwardly with the plunger, the plate 83 engages the finger 85 as the cam 86 clears the cam 87, said plate and finger thus restoring the lever 79 to its initial, idle position.

Preferably, lever 79 is fulcrumed on a transverse pin or the like 88, passing therethrough and through openings in rearward extensions 89 of the side plates 70.

While the operation of the machine as a whole would probably be understood from the explanatory matter given in connection with the description, it may be briefly summarized as follows: The nuts to be cracked are deposited in the receptacle portion 73 of the hopper 57 and the gate 75 is adjusted according to the size of the nuts. These nuts roll down the bottom 74 of said receptacle portion and are received a few at a time upon the feed slide 54 which forms the bottom of the chamber 76. When the crank shaft 21 is now driven, reciprocation of the plunger 35 and the feed slide 54, takes place, these parts operating as a single unit. Each time the slide 54 moves forwardly, opening 56 enters the chamber 65 and the agitating and nut guiding ribs 80 insure that a nut shall be deposited in said opening 56. When the feed slide now moves rearwardly, the opening 56 conveys the nut out of the chamber 76 and if said nut be of a size to project upwardly from the feed slide, the wall section 78 of the end wall 77 will upwardly yield to permit this nut to pass, instead of crushing it. By the time the feed slide 54 has assumed the position shown in Fig. 4, the lever 79 has come into play through the instrumentality of the cams 86—87, causing its nose 85 to downwardly move and force the nut from the opening 56 through the opening 23 and into the cracking cylinder 31. During this forcing of the nut by the nose 85 and during passage of the nut under the wall section 78, yielding of the plate 81 will very often serve to prevent crushing of the nut, whereas it would otherwise be crushed.

By the time the nut reaches the interior of the cylinder 31, the plunger 35 has started again forwardly, with the result that it pushes the nut against the anvil 43, the latter being then in the position of Fig. 4. Further rearward movement of the plunger and nut, causes rearward sliding of the anvil 43 and as the nut nears the outlet 28, the notch or void 67 releases the shoe 64, allowing the dog 48 to drop into engagement with the teeth 47. Thus, the rearward movement of the anvil 43 is arrested just before the crank of the shaft 21 reaches the front dead center position shown in Fig. 6. The result is that as the plunger 35 receives its final forward movement, the nut will be cracked. By the time this cracking operation is complete, the cam 68 engages the screw 69 and again releases the dog 48. At this same time, the lug 52 of the ejector 50 has been released by the slot 53, the result being that the spring 51 quickly snaps said ejector downwardly to the position of Fig. 6, thus knocking the cracked nut through the outlet 28 and into the chute 38. While this discharge of a cracked nut is taking place, the opening 56 of the feed slide 54 is receiving another nut. As this feed slide and the plunger again move rearwardly, this nut is carried in the same manner as above described, and when slide 54 reaches a predetermined position on its rearward travel, its pin 58 engages the rear end of the slot 59, whereupon said slide drags the floating anvil 43 back to its initial position, (Fig. 4), in readiness for engagement with the next nut, when the latter is dropped through the inlet 23.

The machine is comparatively simple and inexpensive, and may be rapidly and efficiently operated, regardless of slight variance in the size of the nuts. Moreover, by changing the diameter of the cracking plunger and its receiving cylinder, by the means hereinbefore described, the machine may be made to crack either relatively large nuts or comparatively small nuts.

Excellent results are obtainable from the general construction shown and described and such construction is therefore preferably followed. However, the present disclosure is illustrative only and numerous variations may be made. Moreover, it is to be understood that such terms as upper, lower, front and rear, are relative rather than limiting.

I claim:

1. A nut cracking machine comprising a hollow body having a nut inlet and a nut outlet, a plunger slidable in said body operating means for said plunger for alternately moving it rearwardly to expose said inlet and advancing it to crack a nut received in the body from the exposed inlet, a floating anvil slidable in said body in advance of the plunger for co-action with the latter, means movably mounted on said body for arresting movement of said anvil under influence of the nut and plunger when the nut approaches said outlet, a nut hopper adjacent said body, a feed slide between the body and hopper for conveying nuts one at a time to said nut inlet, said slide being connected with said plunger for movement bodily therewith, means on said feed slide for releasing the aforesaid arresting means after cracking of the nut between plunger and anvil, permitting discharge of the cracked nut through the aforesaid outlet, and a lost-motion operating connection between said feed slide and said anvil for returning the latter to its initial nut-engaging position upon rearward movement of the plunger to again expose the aforesaid nut inlet.

2. A nut cracking machine comprising a hollow body having a nut inlet in its upper side and a nut outlet, a plunger slidable in said body, operating means for said plunger for alternately moving it rearwardly to expose said nut inlet and advancing it to crack a nut received in the body from the exposed inlet, a floating anvil slidable in said body in advance of the plunger for co-action with the latter, means movably mounted on said body for arresting forward movement of said anvil under influence of the nut and plunger when the nut approaches said outlet, a nut hopper over said body, a feed slide resting on said body and forming a bottom for the hopper, said slide being operable to feed nuts one at a time to said inlet and being connected with said plunger for movement bodily therewith, means on said feed slide for releasing the aforesaid arresting means after cracking of the nut between plunger and anvil, permitting discharge of the cracked nut through the aforesaid outlet, and a lost-motion operating connection between said feed slide and said anvil for returning the latter to its initial nut-engaging position upon rearward movement of the plunger to again expose the aforesaid nut inlet.

3. A nut cracking machine comprising a hollow body having a nut inlet and a nut outlet, a plunger slidable in said body, operating means for said plunger for alternately moving it rearwardly to expose said inlet and advancing it to crack a nut received in the body from the exposed inlet, a floating anvil slidable in said body in advance of the plunger for co-action with the latter, teeth spaced apart along a portion of said anvil, a dog movably mounted on said body for engagement with said teeth to arrest movement of said anvil under influence of the nut and plunger when the nut approaches the aforesaid outlet, a nut hopper adjacent said body, a feed slide between the body and hopper for conveying nuts one at a time to said nut inlet, said slide being connected with said plunger for movement bodily therewith, means embodying a longitudinal arm on said feed slide for controlling the aforesaid dog and releasing it when the nut has been cracked, permitting discharge of the cracked nut through the aforesaid outlet, and a lost-motion operating connection between said feed slide and said anvil for returning the latter to its initial nut-engaging position upon rearward movement of the plunger to again expose the aforesaid nut inlet.

4. A nut cracking machine comprising a horizontally elongated body hollow from end to end, the upper side of said body having a nut inlet and the lower side thereof being formed with a nut outlet spaced forwardly from said inlet, the upper portion of said body being formed with one longitudinal slot in rear of said inlet and with a second longitudinal slot in front of said inlet, a nut-cracking plunger slidable in the rear portion of said body and having a lug projecting upwardly through said one slot, a transverse crank shaft mounted at the rear end of said body and a pitman connecting said crank shaft with said plunger, a floating anvil slidable in the front portion of said body and having a longitudinal slot under the second named slot, said anvil being co-operable with said plunger in cracking a nut received between plunger and anvil from said inlet, the front portion of said anvil having longitudinally spaced teeth, a dog pivoted to said body and co-operable with said teeth to arrest forward movement of the anvil under influence of the nut and plunger as the nut approaches the aforesaid outlet, a nut hopper mounted over said body, a feed slide resting slidably on said body for feeding nuts one at a time to said inlet, the rear end of said feed slide being directly connected to the aforesaid lug whereby plunger and feed slide must move bodily, means at the front end of said feed slide for controlling the above-named dog and releasing it after cracking of the nut, permitting dropping of the cracked nut through said outlet, and a rigid pin projecting downwardly from said feed slide through said second slot and into the slot of said anvil, this slot and said pin serving to return the anvil to its initial nut-engaging position as the plunger and slide again move rearwardly.

5. In a nut cracking machine, a hollow body, a nut-cracking plunger slidable therein, a nut hopper over said body, and a nut-feeding slide between the body and hopper and forming a bottom for the latter, said bottom-forming slide and said plunger being directly connected for movement bodily.

6. In a nut cracking machine, a hollow body having a slot, a nut-cracking plunger in the body slidable in a direction longitudinally of said slot, said plunger having a lug projecting through the slot, and a nut-feeding slide at the exterior of said body directly connected to said lug, whereby plunger and slide must move bodily.

7. In a nut-cracking machine, a floating anvil and a nut-feeder having a lost-motion connection with each other.

8. In a nut-cracking machine, a floating slidable anvil having a slot extending in the direction of its movement, a nut-feeding slide, and rigid means projecting from said slide into said slot to establish a lost-motion connection between slide and anvil.

9. In a nut-cracking machine, a hollow body, a slidable anvil therein, said body and anvil having registering slots extending in the direction of movement of the anvil, a nut-feeding slide at the exterior of the body, and a rigid pin projecting from the slide through the slot of the body and into the slot of the anvil, for the purpose set forth.

10. In a nut cracking machine, a slidable anvil against which a nut to be cracked is forced, a movable nut-feeder, means for arresting movement of said anvil under the push of the nut, and means on said feeder for controlling said arresting means and releasing it when the nut has been cracked.

11. In a nut cracking machine, a slidable anvil against which a nut to be cracked is forced, a movable nut-feeder, means for arresting movement of said anvil under the push of the nut, and means on said feeder for controlling said arresting means and releasing it when the nut has been cracked, said means embodying an arm on the feeder for holding said arresting means against action until a predetermined time.

12. In a nut cracking machine, a slidable anvil against which a nut to be cracked is forced, a movable nut-feeder, means for arresting movement of said anvil under the push of the nut, and means on said feeder for controlling said arresting means and releasing it when the nut has been cracked, said means embodying an arm on the feeder for holding said arresting means against action until a predetermined time, and a cam for releasing said arresting means.

13. In a nut cracking machine, a slidable anvil against which a nut to be cracked is forced, said anvil having longitudinally spaced teeth, a pivoted dog stationary with respect to said anvil and co-operable with said teeth to arrest movement of the anvil under the push of the nut, a shoe mounted on said dog and adjustable longitudinally of the anvil, and a track movable longitudinally of the anvil and normally engaging said shoe to hold the dog in idle position, said track having a portion which permits movement of the shoe and dog to engage the latter with the aforesaid teeth at a predetermined time.

14. In a nut cracking machine, a nut hopper, a feed slide forming a bottom therefor and having a nut receiving opening, nut-cracking means fed by said slide, means for operating said slide to move its nut-receiving opening alternately into and out of the hopper, and means at the exterior of said hopper for forcing nuts which would otherwise lodge, from the opening to the cracking means as said opening reaches a position outside of the hopper.

15. In a nut cracking machine, a nut hopper, a feed slide forming a bottom therefor and having a nut-receiving opening, nut-cracking means fed by said slide, means for operating said slide to move its nut-receiving opening alternately into and out of the hopper, and means actuated by said slide and disposed at the exterior of said hopper for forcing nuts which would otherwise lodge, from the opening to the cracking means as said opening reaches a position outside of the hopper.

16. In a nut cracking machine, a nut hopper, a feed slide forming a bottom therefor and having a nut-receiving opening, nut-cracking means fed by said slide, means for operating said slide to move its nut-receiving opening alternately into and out of the hopper, and a lever extending longitudinally of the slide at the exterior of said hopper and having a nose for forcing nuts which would otherwise lodge, from the opening to the cracking means, said slide and lever having co-operating means for actuating said lever.

17. In a nut cracking machine, a nut hopper, a feed slide forming a bottom therefor and having a nut-receiving opening, nut-cracking means fed by said slide, means for operating said slide to move its nut-receiving opening alternately into and out of the hopper, and a lever extending longitudinally of the slide at the exterior of said hopper and having a nose for forcing nuts which would otherwise lodge, from the opening to the cracking means, said slide and lever having co-operating cam portions for actuating said lever.

18. In a nut cracking machine, a nut hopper having a vertically yieldable wall section, and a feeder having means for forcing nuts one at a time under said wall section, upward yielding of said section under the influence of a large nut, preventing crushing of the latter.

19. In a nut cracking machine, a nut hopper, a feed slide forming a bottom therefor, and nut-agitating means on said slide embodying ribs oblique to the line of movement of the feeder, said feeder having a nut-conveying opening to which said ribs converge.

20. In a nut cracking machine, a nut-cracking plunger, a movable anvil co-operable therewith and having a longitudinal slot, and a spring-actuated ejector lever extending longitudinally of and stationary with respect to said anvil to prevent lodging of nuts between plunger and anvil, said lever having an anvil-engaging lug for reception in said slot to permit actuation of said lever, said lug being co-operable with one end of the slot to effect return of said lever to idle position.

21. In a nut cracking machine, a hollow body having a slot, a nut and plunger receiving cylinder in said body having a lug projecting outwardly through said slot, and means engaging said lug to hold the cylinder removably in place.

22. In a nut cracking machine, a nut cracking plunger, and a sleeve applicable thereto to increase its diameter for cracking relatively large nuts.

23. In a nut cracking machine, nut cracking means, a movable feed member having an opening for conveying nuts to said cracking means, and an ejector synchronized with said feed member for forcing nuts which would otherwise lodge, from said opening.

24. In a nut cracking machine, a nut feeding slide having a nut conveying opening and a groove at one side of said opening and extending thereto, and a plate removably secured in said groove and disposed in opposed relation with the opposite side of said opening to permit only nuts under predetermined size to pass.

25. In a nut cracking machine, a nut cracking plunger, a movable anvil co-operable therewith, an ejector movably mounted independently of said anvil and plunger, and means for operating said ejector, said ejector being operable between said plunger and said anvil to prevent lodging of cracked nuts.

26. In a nut cracking machine, a nut receiving cylinder, and a nut cracking plunger in said cylinder embodying a removable sleeve forming the peripheral portion of the plunger.

27. In a nut cracking machine, a hollow body, a cylinder in the same, and means holding said cylinder removably in place, permitting substitution of a cylinder of different internal diameter.

In testimony whereof I have hereunto affixed my signature.

WILEY NOETH GRADICK.